United States Patent [19]

Davis

[11] Patent Number: 4,828,031

[45] Date of Patent: May 9, 1989

[54] IN SITU CHEMICAL STIMULATION OF DIATOMITE FORMATIONS

[75] Inventor: Bruce W. Davis, Fullerton, Calif.

[73] Assignee: Chevron Research Company, San Francisco, Calif.

[21] Appl. No.: 107,323

[22] Filed: Oct. 13, 1987

[51] Int. Cl.$^4$ .................. E21B 43/22; E21B 43/24

[52] U.S. Cl. .................. 166/272; 166/273; 166/274; 166/275; 166/303; 166/305.1; 208/435; 208/429; 252/8.554

[58] Field of Search .................. 166/272-275, 166/303, 305.1; 252/8.554; 208/435, 429

[56] References Cited

U.S. PATENT DOCUMENTS

| | | | |
|---|---|---|---|
| 2,903,407 | 9/1959 | Fischer et al. | 208/435 |
| 3,079,326 | 2/1963 | Neuworth . | |
| 3,131,759 | 5/1964 | Slusser et al. | 166/305.1 |
| 3,258,071 | 6/1966 | Shen et al. | 166/275 |
| 3,279,538 | 10/1966 | Doscher | 166/272 X |
| 3,357,487 | 12/1967 | Gilchrist et al. . | |
| 3,402,770 | 9/1968 | Messenger | 166/272 X |
| 3,437,141 | 4/1969 | Brandner et al. | 166/273 |
| 3,500,920 | 3/1970 | Raifsnider | 166/273 |
| 3,503,868 | 3/1970 | Shields | 208/429 |
| 3,848,276 | 11/1974 | Walker . | |
| 3,927,716 | 12/1975 | Burdyn et al. | 166/274 |
| 4,167,470 | 9/1979 | Karnofsky . | |
| 4,191,252 | 3/1980 | Buckley et al. | 166/272 |
| 4,260,019 | 4/1981 | Blair, Jr. | 166/274 |
| 4,374,023 | 2/1983 | Davis | 208/429 |
| 4,448,669 | 5/1984 | Scinta . | |
| 4,461,695 | 7/1984 | Williams . | |
| 4,485,871 | 12/1984 | Davis | 166/272 X |
| 4,617,105 | 10/1986 | Miller | 208/412 |
| 4,640,352 | 2/1987 | Vanmeurs et al. | 166/272 X |
| 4,714,112 | 12/1987 | Nigrini et al. | 166/303 X |

FOREIGN PATENT DOCUMENTS

| | | |
|---|---|---|
| 621844 | 6/1961 | Canada . |
| 1559948 | 1/1980 | United Kingdom . |

OTHER PUBLICATIONS

Alford et al, "Utah Tar Sands to be Developed", *Hydrocarbon Processing*, Jun. 1981, pp. 127-130.

*Primary Examiner*—George A. Suchfield
*Attorney, Agent, or Firm*—S. R. La Paglia; E. J. Keeling; V. A. Norviel

[57] ABSTRACT

An improved method of recovering oil from diatomite is described. A solvent is injected into the diatomite followed by an aqueous surface active solution. The aqueous surface active solution contains a diatomite/oil water wettability improving agent and an oil/water surface tension lowering agent. The method may be supplemented by injection of water and/or steam into the diatomite.

22 Claims, No Drawings

IN SITU CHEMICAL STIMULATION OF DIATOMITE FORMATIONS

FIELD OF THE INVENTION

The present invention relates to recovery of crude oil. In particular, the present invention provides an improved method for recovering hydrocarbons from diatomite formations.

BACKGROUND OF THE INVENTION

Hydrocarbon bearing diatomite formations are unique because they often have high oil saturation and high porosity, but have little permeability, i.e., they contain significant amounts of oil but few flow channels or fractures through which oil could flow and, ultimately, be recovered. The unique properties of this type of formation arise because of its morphology. The formation is composed largely of skeletal remains of diatoms. These skeletons and their fragments are hollow and fluids may flow only through natural micropores and through fractures and openings resulting from skeletal decrepitation.

Oil recovery from diatomite formations is usually quite limited because a significant portion of oil saturation may be bypassed using conventional production techniques such as cyclic or drive steaming. Significant improvement of oil recovery would require that a method of displacing oil from the interior of the diatoms into the flow channels between the diatoms be provided. Furthermore, it would be necessary to improve permeability in the natural flow channels so that the oil can be recovered.

Various methods have been proposed for increasing crude oil production from diatomite formations. For Example, U.S. Pat. No. 4,485,871 (assigned to the assignee of this application) teaches a method of recovering hydrocarbons from diatomite in which an alcohol is injected into the formation followed by an aqueous alkaline solution. However, it has been found that certain formations do not respond to this type of stimulation. In particular, oil recovery using this method is not optimum in formations which are deeply buried and have not been extensively exposed to the atmosphere or oxygen bearing formation water. The interfacial tension and oil/rock wettability in these deeply buried formations must be modified in order to enhance oil recover. A related method is described in U.S. Pat. No. 4,374,023, also assigned to the assignee of this application.

U.S. Pat. No. 4,167,470 teaches an alternative method of recovering oil from diatomite in which a hydrocarbon solvent is contacted with mined diatomite ore in a 6 stage extraction process. Solvent is then recovered in a steam stripping apparatus. There are several problems in utilizing this process in a cost effective manner. For example, the ore must be mined, with the attendant environmental and economic considerations. Furthermore, the process is extremely complex and capital intensive. The process is an extraction process and discloses no provision for adding, for example, a chelating agent, and it is not a two-phase process such as is disclosed herein.

British Pat. No. 1,559,948 (Buckley) teaches a method of recovering heavy oil from tar sand (which is sometimes incorrectly attributed to being equivalent to diatomite). Buckley teaches a method of recovering oil from tar sand in which a steam distillable solvent and an oil soluble surfactant are simultaneously injected. The solvent is variously described as being, for example, kerosene or naphtha. The surfactants are described as being in one of two classes, i.e., thermally labile or steam distillable. An oil soluble surfactant such as thermally labile surfactants are suggested as being alkylaryl sulphonates or alkaryl naphthenic sulphonates. Examples of such steam distillable surfactants are suggested as being alkyl and other amines. Again, this is an extraction process and does not suggest a more preferred two-phase process such as disclosed herein.

It is clear from the above that an improved method of producing oil from diatomaceous formations is desirable.

SUMMARY OF THE INVENTION

I have devised an improved method of recovering oil from diatomite formations. The method generally comprises the steps of introducing an aqueous surface active solution into the diatomite formations, the aqueous surface tension altering solution comprising (i) a diatomite/oil wettability modifying agent and (ii) an oil/water interfacial tension lowering agent; and producing oil from the diatomite formation. Alternatively, the method comprises the steps of introducing an aqueous diatomite/oil wettability modifying agent into the diatomite formation; and thereafter introducing an aqueous oil/water interfacial tension lowering agent into the diatomite formation; and producing oil from the diatomite formation. In a preferred embodiment the method further comprises the step of first introducing a solvent into the diatomite formation. In another preferred embodiment the diatomite/oil wettability modifying agent is selected from the group consisting of: trisodiumnitrilotriacetate, sodium metasilicate, inorganic silicates, phosphates, phosphonates, organic chelating agents, Dequest 2006 TM, and Dequest 2000 TM. In another preferred embodiment the interfacial tension lowering agent is selected from the group consisting of: anionic and nonionic surfactants, ethoxylated sulfates, sulfonates, ethoxylated sulfonates, ethoxylated $C_{11}$ to $C_{15}$ alcohols, $C_3$ to $C_{10}$ alcohols, ethoxylated phenols, ethoxylated alcohols, and mixtures thereof. The method may further be supplemented by the step of introducing steam into the diatomite formation.

DETAILED DESCRIPTION OF THE INVENTION

The method described in this invention provides an improved method of recovering oil from a diatomaceous formation containing hydrocarbons. In the preferred embodiment an essentially water insoluble solvent is injected into the formation. The solvent is followed by the introduction of a material which alters the wettability of the oil on the diatomite surfaces. Thereafter or concurrently with, an oil/water interfacial tension lowering agent is introduced, followed by steam injection.

In a preferred embodiment the solvent is petroleum naphtha or Hydrobate TM, which is a desulfurized gasoline blending stock. Other substantially hydrocarbon soluble or slightly soluble solvents may be acceptable in certain situations. For example, it may be desirable to use $C_4$ to $C_{10}$ alcohols (such as is described in U.S. Pat. No. 4,485,871, incorporated herein by reference), a variety of thinners such as 225 thinner, or kerosene, or other hydrocarbon soluble or slightly soluble materials such as light gas oil, diesel, kerosene, jet fuel, gasoline, aviation fuel or other refinery fractions. In one formation it is believed that injection of 0.35 pore volumes of solvent could be optimum.

After injection of the solvent, an aqueous surface active solution is introduced or injected into the formation which contains a material for changing the wettability of the oil with respect to the diatomite and a material for lowering the interfacial tension of the oil/solvent mixture against the surface active solution in capillaries in the formation. In the preferred embodiment, the volume of surface active solution is approximately 1 to 2 times the solvent. In one formation it is believed that the optimum amount of surface active solution would be approximately 1.5 times the volume of solvent. In a preferred embodiment the composition of the solution is as follows:

0.75% by weight polypropylene toluene sulfonate (PPTS) (from 14% active).
0.25% by weight Tergitol TM 15-S-12, from 100% active.
0.5% by weight Dequest 2006 TM, from 40% active.
0.16% by weight potassium chloride (or substitute 0.5% by weight Dequest with 0.8% Dequest and add 0.25% NaCl).

Although polypropylene toluene sulfonate is used to lower interfacial tension, other anionic surfactants may be appropriate such as sulfonates, ethoxylated sulfonates, and ethoxylated sulfates in varying concentrations. Nonionic surfactants may also be used to lower oil/aqueous interfacial tension.

Tergitol½ 15-S-12 is an ethoxylated $C_{11}-C_{15}$ secondary alcohol, which would serve as a cosurfactant. Other consurfactants in the class may also be suitable, e.g., Tergitol½ 15-S-9. The following groups of compounds may also be appropriate in some situations: $C_3-C_6$ alcohols, ethoxylated alkyl phenols, and other ethoxylated alcohols. Tergitol½ 15-S-12 is considered most advantageous. The ratio surfactant to cosurfactant will usually vary from 4 to 1 to 2 to 1. Here we have a ratio of 3 to 1 by weight. In one formation it is believed that the most optimum concentration of Tergitol TM 15-S-12 is 0.25% by weight.

Dequest 2006 TM, i.e., Aminotri (methylene phosphonic acid) pentasodium salt may be sutstituted with, for example, trisodium nitrilotriacetate (TSNTA) or sodium metasilicate ($Na_2SiO_3$). One may also substitute Aminotri (methylene phosphonic acid), pentapotassium salt made by neutralizing Dequest 2000 TM with KOH. This may obviate the need for including KCl as an added electrolyte. Other classes of compounds that may be appropriate for modifying wettability are other inorganic silicates and phosphates and other organic chelating agents. The concentration of such compounds is determined by oil recovery tests on coarsely ground oil-containing diatomite.

An electrolyte may optionally be added to the surface active solution. Examples of such electrolytes include NaCl, KCl, and the like. The purpose of such electrolyte is generally to provide optimum interfacial tensions between the surface active solution and the oil/solvent phase. In the preferred embodiment, 0.16% by weight solution is used for KCl.

Optionally, prior to steam injection an aqueous saline solution such as KCl should be injected (or NaCl if clay damage is not anticipated) into the formation. This solution serves as a "spacer" to reduce thermal decomposition of the dewetting agent and further mobilize additional oil by pushing surface active solution further into the formation. The KCl concentration is adjusted to provide the lowest possible interfacial tension with the oil/solvent at the trailing edge of the aqueous surface active solution. In a preferred embodiment the KCl concentration is 0.42% by weight. KCl also serves to reduce clay damage.

Injection pressure into the formation should generally be held just below the value where a long fracture may be induced. This is generally desirable for several reasons:

1. A long fracture results in fluids moving along fracture faces and being injected at distances far removed from well bore.

2. It is not possible to monitor saturation changes along fracture faces because of large distances from the well bore.

3. If a fracture heals or a new fracture is created during injection of solvent and/or surface active solution, these fluids will be positioned in different parts of the formation reducing effectiveness of the process.

4. Long fractures give poor conformance for injection of fluids and steam so that portions of reservoir are bypassed. Since the process would likely be used as a single well stimulation or with a closely spaced pattern, a fracture should have a significant effect on the process performance.

5. Fluid saturations in a fracture more readily segregate than radially dispersed fluids in smaller pores. This is less desirable for this stimulation process.

In diatomite formations it may be desirable to prevent dissolution of, for example, silicate or carbonate materials during steaming. Application Ser. No. 654,331, now abandoned, assigned to the assignee of the present invention, discloses a method for going so and is incorporated by reference herein for all purposes. To prevent dissolution of carbonate or silicate material, the pH of injected steam is reduced by adding a salt having a volatile cationic component and a nonvolatile anionic component. The salts are preferably ammonium salts which reduce the ambient pH to about 5.0 to 9.2. The salts are preferably ammonium chloride, ammonium hydroxide, ammonium acetate, ammonium nitrate, ammonium sulfate, or mixtures thereof. The steam injection step is carried out in a fashion familiar to one skilled in the art and can be either a cyclic steaming step or a steam drive step.

It may also be possible to utilize alternative methods of heating the formation. For example, radiofrequency heating may be utilized. Hot water injection may also be desirable in some formations.

It is believed that the method described above increases oil recovery because the wettability lowering agent frees the oil from diatomite skeletons and their fragments. The oil/water interfacial tension lowering material reduces capillarity and allows the oil to move more freely in the formation.

In order to demonstrate the utility of the invention and to further aid in teaching one how to make and use the invention, the following examples are provided.

EXAMPLES

Example 1

The overall process is illustrated below in a hypothetical example using a selected diatomaceous formation. The discussion below can easily be adapted to other formations. Approximate petrophysical data for the reservoir are summarized below:
- Depth = 1250 to 1350 feet
- Porosity = $\phi$ = 0.52
- Apparent grain density = 2.1 grams/cm$^3$
- Lithology—Diatomite and silty diatomite
- Air permeability = 4 md
- Oil gravity = 12° API
- GOR $\cong$ 0
- Connate Water Total Dissolved Solids = 11,300 ppm
- Formation Temperature = 71° F. + 2.14 (°F/100 ft.)×13 $\cong$ 99° F.
- Hydrostatic Formation Pressure = 15 + 0.44 (psi/ft.) $\cong$ 587 psia
- Estimated Formation Pressure = 15 + 0.55 (psi/ft.) $\cong$ 730 psia
- Estimated Fracture Pressure = 15 + 0.65 psia/ft. $\cong$ 860 psia
- Oil Viscosity (99° F.) = 1600 cp
- External flow radius = 233 ft. (5 acre spacing)
- Well bore radius = 0.276 ft.
- Original Oil Saturation = 0.25

These properties will be used below to characterize a chemical stimulation strategy for this diatomaceous formation.

The volume of original oil in place, $V_{ooip}$, is given as a function of radial distance from the well, r, by the following relation $$V_{ooip} = \frac{\pi r^2 h \phi S_{oi}}{5.615} \text{ Barrels (BBL)} \quad (1)$$

where h is the pay thickness, $\phi$ is the porosity and $S_{oi}$ is the initial oil saturation.

For 100 ft. of pay, $S_{oi}$ = 0.25 and $\phi$ = 0.52, eq. (1) becomes $$V_{ooip} = 7.27 \, r^2 \, (BBL) \quad (1a)$$

Table 1 provides values of $V_{ooip}$ for different radial distances from the well.

TABLE 1

| Original Oil in Place as a Function of Radial Distance | |
|---|---|
| $V_{ooip}$ (BBL) | r(ft.) |
| 727 | 10 |
| 1,636 | 15 |
| 18,175 | 50 |
| 395,000 | 233 |

In more familiar terms this formation contains a little more than 1000 BBL of oil per acre-foot.

Laboratory tests on native diatomite core material indicate that approximately 0.35 pore volume of solvent can be naturally imbibed. This serves as a first estimate of solvent requirement. A solvent injection corresponding to a ten foot radial sweep is arbitrarily chosen. This can easily be scaled up or down as required. Solvent volume ($V_s$) may be calculated from $$V_s = \frac{\pi r^2 h \, 0.35 \, \phi}{5.615} \text{ (BBL)} \quad (2)$$

$$= 10.2 \, r^2 = 1018 \, BBL$$

Injection volume of aqueous surface active solution ($V_{SAS}$) occurred at a volume ratio of 3:2 in laboratory studies. The same ratio is chosen here and results in $$V_{SAS} = 15.3 \, r^2 = 1527 \, BBL \quad (3)$$

Injection of an aqueous saline solution prior to steam injection should reduce thermal decomposition of the dewetting/chelating agent and mobilize additional oil by pushing chemicals farther into the formation. Consequently, an additional 200-1000 BBL of potassium chloride solution is recommended for injection just prior to steam stimulation.

Chemical requirements for the above suggested volumes are summarized below. It should be reemphasized that the amounts shown are for illustrative purposes only.

TABLE 2

| Chemical Requirements | |
|---|---|
| Solvent | 1018 BBL Petroleum Naphtha |
| Aqueous Surface Active Solution | 1527 BBL Total |
| (a) PPTS 0.75% active | 4007 lb. active total (actual weight 26,630 lb.) |
| (b) Tergitol TM 15-S-12 (0.25% active) | 1336 lb. active total |
| (c) Dequest 2006 TM (0.5% active) | 2672 lb. active total |
| (d) KCl (0.16%) | 885 lb. total |

As a first approximation, injectivities ($q_i$) may be calculated by assuming a discontinuous flood front between the injected and displaced phases. This assumption leads to concentric zones of radial flow for a homogeneous formation [See M. Muskat, "Physical Principles of Oil Production, 2nd Ed.," Intl. Human Res. Dev. Corp., Boston, 1981, p. 243.] The injectivity may then be written as $$q_i = (BBL/day) \frac{7.08 \times 10^{-3} \, k(md) h \, (ft.) \, (P_w - P_e) \, (psi)}{\frac{\mu_i(cp)}{k_{ri}} \ln(r/r_{wb}) + \frac{\mu_d(cp)}{k_{rd}} \ln(r_e/r)} \quad (4)$$

where k is the permeability, h is the pay thickness, $P_w$ is the well pressure, $P_e$ is the formation boundary pressure, $\mu$ is the viscosity, $k_r$ is the relative permeability, r is the radial distance for the flood front, $r_{wb}$ is the well bore radius and $r_e$ is the formation boundary distance and where i refers to the injected phase and d to the displaced phase.

For present calculations the largest uncertainty lies in the permeability for single phase fluid flow. Also, the relative permeability for injected phase is that for saturations behind the flood front and that for displaced phase is that for saturations ahead of the flood front. Estimates can be made for injectivity as a function of flood front distance from the well bore and as a function of permeability as follows.

A. Solvent Injectivity

Solution injection into a native diatomaceous formation is visualized as one in which the displaced phase is primarily connate water. This will not be far from the actual situation since oil probably resides largely within the diatom matrix and not in the principal natural flow channels. Specializing eq. (4) to determine solvent injectivity ($q_s$):

$$q_s = \frac{7.08 \times 10^{-3} \, k \, h \, (P_w - P_e)}{\ln(r/r_{wb}) + M \ln(r_e/r)} \cdot \frac{(k_{rs})_{BF}}{\mu_s}$$

where

-continued $$M = \frac{(k_{rs})_{BF}}{\mu_s} / \frac{(k_{rw})_{AF}}{\mu_w} \equiv \text{mobility ratio.}$$

The viscosity of solvent at any temperature may be determined from $$ln[\mu_s](cp) = -4.38 + 2.91 \, (T_b/T) \qquad (6)$$

where $T_b$ is the boiling point at 50% volumetric cut and T is the reservoir temperature, both in °R (or °K). Equation (6) yields $\mu_s = 0.40$ cp.

The viscosity of water at 99°F is known experimentally to be 0.69 cp.

Having no direct information about relative permeabilities in the natural fracture flow system let us adopt the rough approximation $$(k_{rs})_{BF}/(k_{rw})_{AF} = 1.$$

where BF indicates behind the front and AF indicated ahead of the front.

The formation pressure is estimated to be 730 psia. If fracture pressure is assumed to be about 0.65 psi/ft. then the maximum well bore pressure is 860 psia at 1300 ft. In actual practice it may be possible to exceed this hypothetical fracture pressure without inducing a major large scale fracture. The maximum pressure differential based on the estimated fracture pressure, for injections is then only about 130 psi. Equation (5) then simplifies to $$q_s = (BBL/day) \frac{230 \, k}{\ln(r/.276) + 1.73 \ln(233/r)} \qquad (7)$$

Table 3 summarizes solvent injectivities for 1, 10, 50 and 100 md. for values of r = 0.276, 2, 5, and 10 ft.

TABLE 3

| | Solvent Injectivities qs (BBL/DAY) | | | | |
|---|---|---|---|---|---|
| k = | 1 md | 10 md | 50 md | 100 md | r(ft) |
| | 20 | 198 | 988 | 1975 | 0.276 |
| | 23 | 225 | 1125 | 2250 | 2 |
| | 24 | 240 | 1200 | 2400 | 5 |
| | 26 | 255 | 1275 | 2550 | 10 |

B. Aqueous Surface Active Solution Injectivity

Aqueous solution injectivity into the solvent saturated zone surrounding the well bore may also be estimated. Assume that oil and solvent mix in the same proportion as they coexist in a ten foot radius from the well bore. In that case, solvent volume fraction, $\phi_s$, will equal 0.583. A one-fourth power mixing rule suffices to estimate the viscosity of solvent/oil (s/o) mixture released by the surface active solution. The mixing rule is given by $$\frac{1}{\mu_{s/o}^{\frac{1}{4}}} = \frac{\phi_s}{\mu_s^{\frac{1}{4}}} + \frac{1 - \phi_s}{\mu_o^{\frac{1}{4}}} \qquad (8)$$

which in this case results in $\mu_{s/o} = 2.45$ cp.

Furthermore, assume that the surface active solution may be represented by a suspension containing about 1 vol% spherical micelles. Its relative viscosity, $\mu_r$, will equal about 1.026 and its viscosity at 99° F. will equal 0.71 cp. Making the same rough approximation as before concerning relative permeability in a naturally fractured system, eq. (5) becomes $$q_{SAS} = \frac{130 \, k}{[\ln(r/.276) + 3.45 \ln(233/r)]} \qquad (9)$$

where $q_{SAS}$ is the injectivity for the surface active solution displacing a solvent/oil bank. Table 4 lists injectivities for 1, 10, 50 and 100 md.

TABLE 4

| | Solvent Injectivities qs (BBL/DAY) | | | | |
|---|---|---|---|---|---|
| k = | 1 md | 10 md | 50 md | 100 md | r(ft) |
| | 6 | 56 | 280 | 559 | .276 |
| | 7 | 71 | 354 | 707 | 2 |
| | 8 | 81 | 403 | 805 | 5 |
| | 9 | 90 | 450 | 900 | 10 |

The possibility that solvent injection may improve relative permeability should also be kept in mind. One alternative strategy would be to increase solvent injection pressure until the formation fractures. However, it is generally preferred to maintain pressure below fracture pressure or least below a pressure at which a very long fracture would be formed.

It is now desirable to estimate potential oil recover. It was already observed in Table 1 that the original oil in place available to a single well was almost 400,000 BBLS for a 233 foot drainage radius. The actual drainage radius may be limited to a smaller distance comprising the radius of steam propagation plus an additional increment due to penetration of chemicals beyond the steam front. Assuming this distance is conservatively about 100 ft., there is a possibility of producing as much as 74,000 BBL of oil, just from completion in this 100 foot pay. Since production from cyclic steaming operations in diatomaceous formations is somewhat unpredictable, there is no well-defined baseline for predicting what fraction of this oil will actually be recovered. Laboratory studies suggest that of the order of 50% of the matrix oil may be released into flow channels even without steam stimulation (i.e., 37,000 BBL).

EXAMPLE 2

Diatomite Shaker Bath Tests

Shaker tests were carried out on 5-10 mesh oilbearing diatomite chips which had been pre-saturated with Hydrobate ™. The chips were immersed in different aqueous surface active solutions to evaluate their ability to release matrix oil.

The following procedure was used:
1. 50 g of 5–10 mesh oil-bearing diatomite chips were weighed into 250 ml polypropylene bottles.
2. Each sample was saturated with 10 ml of Hydrobate ™ (desulfurized petroleum naphtha).
3. 160 g of surface active solution was then added to each sample.
4. Samples were then shaken moderately for 2 hrs. at 100° F.
5. Sample bottles were then removed and centrifuged at 2000 rpm to remove suspended solids.
6. Oil and surface active solution is then decanted off and the samples rinsed with deionized water.
7. Samples are then dried for 16 hrs. in a vacuum oven at 35° C.
8. Samples are transferred to extraction apparatus and extracted with $CH_2Cl_2$ overnight.

9. The $CH_2Cl_2$ is removed from the extracted crude by Roto-Vap evaporation at 60° C.
10. Using a knowledge of original oil content, the percent recovery is determined by difference.

The results of the above tests are illustrated in Table 5.

TABLE 5

Percent Recovery from Diatomite Shaker Bath Tests

| Solution | Percent Oil Recovery (±2) |
| --- | --- |
| 0.75% active PPTS, 0.25% Tergitol ™ 15-S-12, 0.5% active Dequest 2006 ™, 0.16% KCl | 74 |
| 0.5% active Dequest 2006 ™, 0.16% KCl | 42 |
| 3% $Na_2SiO_3$ | 51 |
| 0.16% KCl | 36 |
| $H_2O$ | 36 |

EXAMPLE 3

Diatomite Flood Recovery Tests

Flood recovery tests were performed on <10 mesh oil-bearing diatomite which had been hand packed into a water-jacketed column.

The following procedure was used:
1. Smaller than 10 mesh oil-bearing diatomite was tightly packed into a water-jacketed column.
2. System was evacuated and 100° F. water flowed through the water jacket.
3. Diatomite pack was saturated with 1.0 pore volume (PV) of 0.16% KCl.
4. 0.34 PV of Hydrobate ™ was injected and allowed to soak 15 minutes.
5. 0.5 PV of aqueous solution was then injected at 0.135 PV/hr.
6. Temperature was raised to 180° F and 0.16 KCl was injected (same rate) until oil production ceased (≈0.5 PV).
7. Diatomite was removed, rinsed with DI water, and vacuum dried.
8. Sample was extracted using procedure of Example 2.
9. Percent recovery was determined as in Example 2.

The results of the above tests are illustrated in Table 6.

TABLE 6

Percent Recovery from Diatomite Flood Recovery Tests (Error is about ±2%)

| Solution | Percent Oil Recovery (±2) |
| --- | --- |
| 0.75% active PPTS, 0.25% Tergitol ™ 15-S-12, 0.5% active Dequest 2006 ™, 0.16% KCl | 29 |
| $H_2O$ | 0 |

It is to be understood that the above description is intended to be illustrative and not restrictive. The scope of the invention should, therefore, not be determined with reference to the above description but should, instead be determined with reference to the appended claims, along with the full range of equivalents thereto.

What is claimed is:

1. A method of recovering hydrocarbon from a subsurface diatomite formation comprising the steps of:
   a. introducing an aqueous surface solution into the diatomite formation, said aqueous surface active solution comprising (i) a diatomite/oil/ water wettability improving agent, and (ii) an oil/water interfacial tension lowering agent; and
   b. producing oil from the diatomite formation.
2. The method as recited in claim 1 wherein the interfacial tension lowering agent is a surfactant.
3. A method of recovering oil from a subsurface diatomite formation comprising the steps of:
   a. introducing an aqueous diatomite/oil/water wettability improving agent into the diatomite formation; and, thereafter
   b. introducing an aqueous oil/water interfacial tension lowering agent into the diatomite formation, said interfacial tension lowering agent further comprising a surfactant; and
   c. producing oil from the diatomite formation.
4. The method as recited in claim 1 or 3 further comprising the step of first introducing a solvent into the diatomite formation.
5. The method as recited in claim 1 or 3 wherein the diatomite/oil water wettability improving agent is selected from the group consisting of: trisodiumnitrilotriacetate, sodium metasilicate, inorganic silicates, phosphates, phosphonates, organic chelating agents, aminotri (methylene phosphonic acid) pentasodium salt, aminotri (methylene phosphonic acid), and mixtures thereof.
6. The method as recited in claim 1 or 3 wherein the interfacial tension lowering agent is selected from the group consisting of: anionic surfactants, nonionic surfactants, ethoxylated sulfates, sulfonates, ethoxylated sulfonates, ethoxylated $C_{11}$ to $C_{15}$ alcohols, $C_3$ to $C_{10}$ alcohols, ethoxylated phenols, ethoxylated alcohols, and mixtures thereof.
7. The method as recited in claim 1 or 3 wherein said wettability improving agent is aminotri (methylene phosphonic acid) pentasodium salt.
8. The method as recited in claim 1 or 3 wherein said oil/water interfacial tension lowering agent is a mixture of polypropylene toluene sulfonate and an ethoxylated $C_{11}$-$C_{15}$ secondary alcohol.
9. The method as recited in claim 1 or 3 further comprising the step of introducing steam into the diatomite formation after injection of the oil/water interfacial tension lowering agent.
10. The method recited in claim 9 further comprising the step of injecting an electrolyte solution prior to steam-injection into the diatomite formation, said electrolyte selected from the group consisting of KCl, NaCl, and mixtures thereof.
11. The method as recited in claim 9 further comprising the step of introducing a salt into said steam, said salt having a volatile cationic component and a nonvolatile anionic component.
12. The method as recited in claim 9 further comprising the step of introducing an ammonium salt into said steam.
13. The method as recited in claim 1 or 3 further comprising the step of heating said diatomite formation with a radiofrequency heating device after injection of the oil/water interfacial tension lowering agent.
14. The method as recited in claim 1 or 3 wherein the interfacial tension lowering agent is a mixture of a surfactant and a cosurfactant.
15. A method of recovering hydrocarbons comprising:
   a. injecting a solvent into a subsurface diatomaceous material, said solvent selected from the group consisting of: jet fuel, petroleum naphtha, desulfurized gasoline blending stock, aromatic hydrocarbons, naphthenic hydrocarbons, 225 thinner, paraffinic hydrocarbons and mixtures thereof; and, thereafter
b. injecting an aqueous surface active solution into said diatomaceous material, said surface active solution further comprising:
(i) polypropylene toluene sulfonate (PPTS);
(ii) a material selected from the group: trisodium nitrilotriacetate, sodium metasilicate, aminotri (methylene phosphonic acid) neutralized with KOH, (methylene phosphonic acid) pentasodium salt, and mixtures thereof; and
(iii) an electrolyte; and thereafter
c. injecting an aqueous saline solution into said diatomaceous material; and, thereafter
d. injecting steam into said diatomaceous material; and thereafter
e. producing oil from the diatomaceous material.

16. A method of recovering hydrocarbon from a subsurface diatomite formation comprising the steps of:
a. introducing a solvent into the formation;
b. introducing an aqueous surface active solution into the diatomite formation, said aqueous surface active solution comprising:
(i) a diatomite/oil water wettability improving agent and
(ii) an oil/water interfacial tension lowering agent; and
c. producing oil from the diatomite formation.

17. A method of recovering oil from a subsurface diatomite formation comprising the steps of:
a. introducing a solvent into the formation;
b. introducing an aqueous diatomite/oil water wettability improving agent into the diatomite formation; and, thereafter
c. introducing an aqueous oil/water interfacial tension lowering agent into the diatomite formation; and
d. producing oil from the diatomite formation.

18. A method of recovering hydrocarbon from a subsurface diatomite formation comprising the steps of:
a. introducing an aqueous surface active solution into the diatomite formation, said aqueous surface active solution comprising:
(i) a diatomite/oil water wettability improving agent, said wettability improving agent further comprising aminotri (methylene phosphonic acid) pentasodium salt; and
(ii) an oil/water interfacial tension lowering agent; and
b. producing oil from the diatomite formation.

19. A method of recovering oil from a subsurface diatomite formation comprising the steps of:
a. introducing an aqueous diatomite/oil water wettability improving agent said wettability improving agent further comprising aminotri (methylene phosphonic acid) pentasodium salt agent into the diatomite formation; and, thereafter
b. introducing an aqueous oil/water interfacial tension lowering agent into the diatomite formation, said interfacial tension lowering agent further comprising a surfactant; and
c. producing oil from the diatomite formation.

20. A method of recovering hydrocarbon from a subsurface diatomite formation comprising the steps of:
a. introducing an aqueous surface active solution into the diatomite formation, said aqueous surface active solution comprising:
(i) a diatomite/oil water wettability improving agent and
(ii) an oil/water interfacial tension lowering agent, said interfacial tension lowering agent further comprising polypropylene toluene sulfonate and an ethoxylated $C_{11}$–$C_{15}$ secondary alcohol; and
b. producing oil from the diatomite formation.

21. A method of recovering oil from a subsurface diatomite formation comprising the steps of:
a. introducing an aqueous diatomite/oil water wettability improving agent into the diatomite formation; and, thereafter
b. introducing an aqueous oil/water interfacial tension lowering agent into the diatomite formation, said interfacial tension lowering agent further comprising polypropylene toluene sulfonate and an ethoxylated $C_{11}$–$C_{15}$ secondary alcohol; and
c. producing oil from the diatomite formation.

22. A method of recovering hydrocarbon from a subsurface diatomite formation comprising the steps of:
a. introducing an aqueous surface active solution into the diatomite formation, said aqueous surface active solution comprising:
(i) a diatomite/oil water wettability improving agent and
(ii) an oil/water interfacial tension lowering agent, said interfacial tension lowering agent further comprising a surfactant; and
b. producing oil from the diatomite formation.

* * * * *

UNITED STATES PATENT AND TRADEMARK OFFICE
CERTIFICATE OF CORRECTION

PATENT NO. : 4,828,031
DATED : May 9, 1989
INVENTOR(S) : Bruce W. Davis

It is certified that error appears in the above—identified patent and that said Letters Patent is hereby corrected as shown below:

Claim 1, Col. 9, line 66, "surface solution" should read --surface active solution--.

Signed and Sealed this

Sixth Day of February, 1990

*Attest:*

JEFFREY M. SAMUELS

*Attesting Officer*        *Acting Commissioner of Patents and Trademarks*